(12) United States Patent
Askerup

(10) Patent No.: US 7,142,647 B2
(45) Date of Patent: Nov. 28, 2006

(54) DATABASE FOR USE IN TELEPHONE COMMUNICATIONS

(75) Inventor: Hans Anders Askerup, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 340 days.

(21) Appl. No.: 10/655,242

(22) Filed: Sep. 3, 2003

(65) Prior Publication Data

US 2005/0047564 A1    Mar. 3, 2005

(51) Int. Cl.
*H04M 1/64* (2006.01)

(52) U.S. Cl. ............... 379/88.2; 379/120; 379/201.02; 379/266.02

(58) Field of Classification Search ............. 379/88.19, 379/72, 76, 88.07

See application file for complete search history.

(56) References Cited

U.S. PATENT DOCUMENTS 6,763,091 B1 *   7/2004   Shimada .................. 379/88.19

* cited by examiner

*Primary Examiner*—Gerald Gauthier
(74) *Attorney, Agent, or Firm*—Tuan V. Ngo

(57) ABSTRACT

Techniques for storing data used in making announcements in telephone communications are disclosed. In an embodiment, an announcement depends on classes of services associated with telephone subscribers. The classes of services represent call types or call features such as call-forwarding unconditional, call-forwarding busy, call-forwarding no answer, etc. A first database associates subscribed phone numbers with a class of service. A second database defines the class of services such as the call types, the telephone digit pattern in the subscribed telephone numbers, the condition for an announcement, etc. A third database defines a default class of service for use in case a phone number is not associated with a class of service in the first database.

7 Claims, 3 Drawing Sheets

COS(1)
411  XXX-XXX-XXXX
420  XXX-XXX-XXXX

COS(2)
421  XXX-XXX-XXXX
430  XXX-XXX-XXXX

COS(3)
431  XXX-XXX-XXXX
440  XXX-XXX-XXXX

230
Default COS: CFU

220
COS(1): CFU
COS(2): CFU, CFNRI
COS(3): CFNA, SCA

DATABASE FOR USE IN TELEPHONE COMMUNICATIONS

FIELD OF THE INVENTION

The present invention relates generally to telephone communications and, more specifically, to a database for use in such communications.

BACKGROUND OF THE INVENTION

In various situations in telephone communications, it is desirable that, after a caller initiates a call, an announcement is made to notify the caller, for example, the status of the call, the charge that might incur to the caller, etc. In one approach, the announcement system defines a call type and a specific announcement for each subscriber so that such an announcement may be made when appropriate. Unfortunately, when numerous subscribers are involved, provisioning for every subscriber results in managing huge amounts of data. For example, each time a call type is added, data for up to millions of subscribers related to the new call type must be updated. Such process is also tedious, error prone, and expensive. Therefore, what is needed is mechanisms to solve the above deficiencies and related problems.

SUMMARY OF THE INVENTION

The present invention provides techniques for storing data used in making announcements in telephone communications. In an embodiment, an announcement depends on classes of services associated with telephone subscribers. The classes of services represent call types or call features such as call-forwarding unconditional, call-forwarding busy, call-forwarding no answer, etc. A first database associates subscribed phone numbers with a class of service. A second database defines the class of services such as the call types, the telephone digit pattern in the subscribed telephone numbers, the condition for an announcement, etc. A third database defines a default class of service for use in case a phone number is not associated with a class of service in the first database.

Generally, a class of service includes one or a plurality of call types, and a telephone subscriber is associated with a class of service based on which an announcement is made when some conditions are met. For example, if a subscriber is associated with a class of service that includes the call type "call-forward-busy," then, when a caller receives a call busy signal from the subscriber, an announcement is made that the subscriber is busy and the call is forwarded to, e.g., the subscriber's voicemail. For another example, if the same class of service also includes the call type "call-forward-no-answer", then, when the subscriber does not answer a telephone call, an announcement is made that the phone call is forwarded to another number, etc.

BRIEF DESCRIPTION OF THE DRAWINGS

The present invention is illustrated by way of example, and not by way of limitation, in the figures of the accompanying drawings in which like reference numerals refer to similar elements and in which:

FIG. 2 shows a database used by the Home Location Register in FIG. 1, in accordance with an embodiment.

DETAILED DESCRIPTION OF THE PREFERRED EMBODIMENT

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Overview

Figure 1:
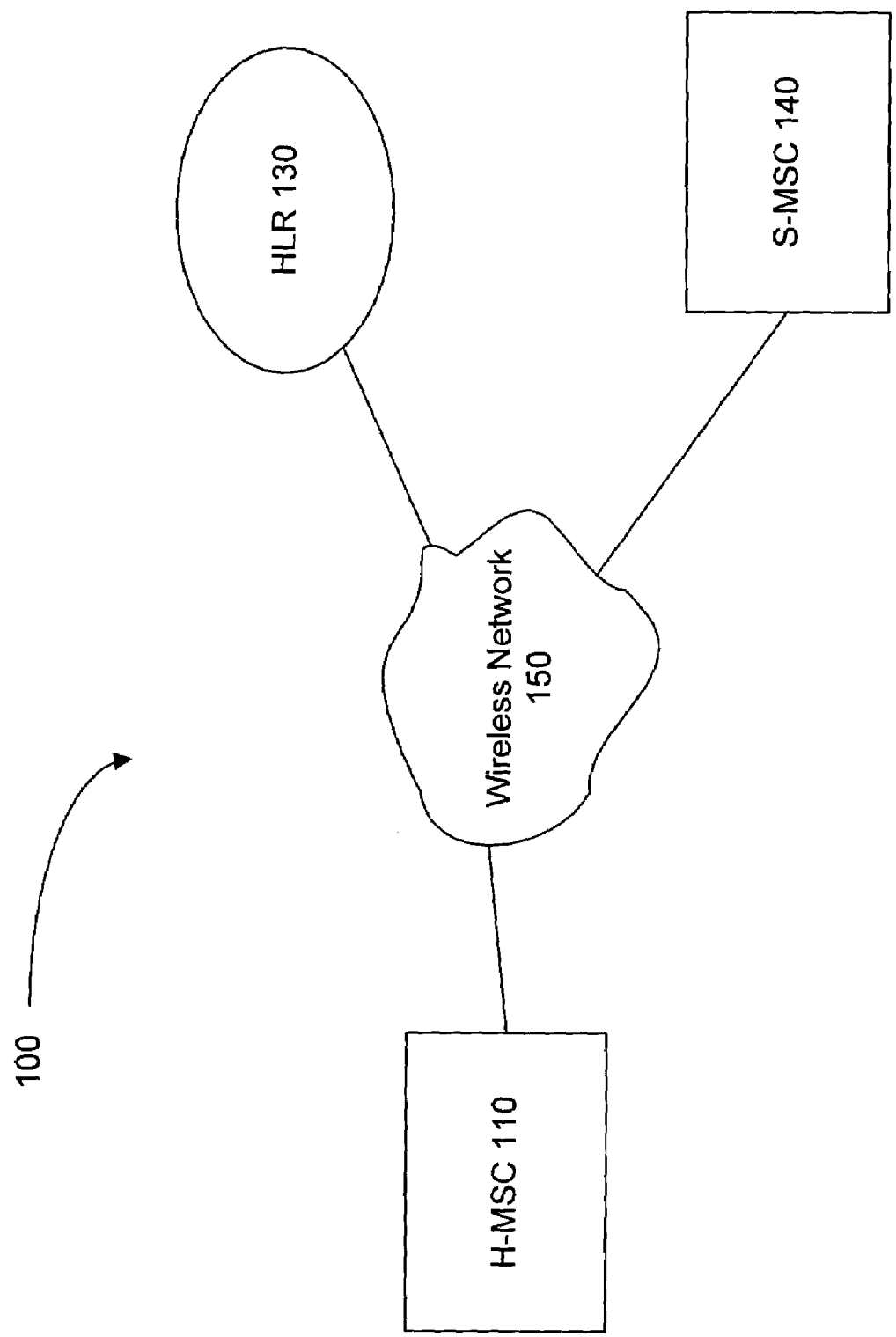
FIG. 1 shows an exemplary telephone network upon which embodiments of the invention may be implemented.

FIG. 1 shows a telephone network 100 upon which embodiments of the invention may be implemented. Telephone network 100 includes a home mobile switch center (H-MSC) 110, a home location register (HLR) 130, a serving mobile switch center (S-MSC) 140, and a wireless network 150.

A subscribed phone number (or subscriber) is associated with a H-MSC 110. When the subscriber is called, regardless of the location of the subscriber at that time, the call, based on the first six digit of the subscriber, is routed to its H-MSC 110. H-MSC 110 includes information such as the network provider and the HLR 130 of the subscriber from which the subscriber may be located as appropriate. Normally, H-MSC 110 sends a Location Request Invoke (LocReq) to HLR 130 to request the location of the subscriber. When a subscriber travels outside the coverage area of its H-MSC 110, H-MSC 110, together with a S-MSC 140, provides services to the subscriber.

HLR 130 is a database storing data for subscribers and, in an embodiment, can handle millions of subscribers. HLR 130 includes data files that associate subscribers with classes of services, define the classes of services, etc., based on which HLR 130 may determine the call type and the announcement code that are associated with a subscriber. HLR 130 also stores information to locate subscribers, the S-MSC 140 that covers an area to which the subscriber travels, etc. To locate a subscriber, HLR 130 sends a Routing Request Invoke (RouteReq) to the corresponding S-MSC 140. Generally, when a subscriber is in the service area of S-MSC 140, S-MSC 140 informs the corresponding HLR 130 that S-MSC 140 now serves the traveling subscriber.

S-MSC 140 serves subscribers when the subscribers travel outside of their H-MSC 110. Generally, when a subscriber travels within the service area of an S-MSC 140, the S-MSC 140, after locating the subscriber, sends a Registration Notification Invoke (RegNot) to the HLR 130 to register with HLR 130 that S-MSC 140 now serves the subscriber. Embodiments of the invention are not limited to how an MSC, e.g., H-MSC or S-MSC, locates a subscriber. In general, an MSC is associated with the area code of the phone number.

Wireless network 150 provides protocols for H-MSC 110, HLR 130, and S-MSC 140 to communicate with one another. In an embodiment, network 150 uses the Signaling System 7 (SS7) and the American National Standards Institutes (ANSI) 41 protocols. The SS7 is normally used for efficient and secure telecommunications and wireless services such as personal communication services (PCS), wireless roaming, mobile-subscriber authentication, call setup, management, etc. Examples of other protocols that may be used in network 150 include the global system for mobile communications (GSM), the message mobile application port (MAP), etc. Embodiments of the invention are not limited by the types of network and/or the protocols used in a network.

Once a call is connected, a call path is created between the calling phone, H-MSC 110, network 150, S-MSC 140, and the called subscriber.

Call Announcements

In an embodiment, a caller receives an announcement depending on a class of service associated with the called subscriber in which the class of service includes the call types or call features of the called subscriber. For example, if the called subscriber has the call type "call-forwarding unconditional" or "call forward no answer," then the announcement indicates that the call is being transferred to, e.g., an email, voice message center, etc. If there is a charge to the caller, then the announcement so indicates, and if the caller does not want to be charged, the call will not be connected, etc.

Call Types

The followings are examples of call types and conditions to trigger a corresponding announcement. Embodiments of the invention are not limited to this exemplary list of call types, but are also applicable to other call types.

CFU: call forwarding unconditional. After the caller initiates the call, an announcement is made that the call is forwarded to another phone number, a voicemail, etc.

CFB: call forwarding busy. When the caller receives a busy signal from the subscriber, an announcement is made that the call is forwarded to another number, a voicemail, etc.

CFNRI: call forwarding not registered/inactive. After the caller initiates the call, an announcement is made that the subscriber is currently not registered in the network and cannot be reached.

CFNA: call forwarding no answer. After a number of rings that the callee does not answer the call, an announcement is made that the call is forwarded to another number, a voice mail, etc.

SCA: selective call acceptance. The callee accepts only some selective numbers, and when a number not in the selective list is detected, an announcement is made that the call cannot be connected.

PCA: password call acceptance. The callee accepts a call only when the caller provides a correct password, and when the call is initiated, an announcement is made asking the caller to provide the password, and if an incorrect password is provided, an announcement is made that the call cannot be connected, etc.

DND: do not disturb. After the caller initiates the call, an announcement is made that the callee does not accept the call at that time.

CD: call delivery. The subscriber is registered in H-MSC 110 or S-MSC 140, is not busy, does not have DND active, etc., and the call is connected.

FA: flexible alerting. A call may be made via a pilot number to ring a plurality of numbers. When the pilot phone is used to call the pilot number, an announcement so indicates, and the system calls all the group members.

MAH: mobile access hunt. This feature is similar to the FA feature, however, the MAH allows to call each group member one at a time and the call is connected when the first group member picks up the phone.

In an embodiment, each announcement corresponding to a call type is identified by an announcement code. For example, announcement code ANNCODE(1) corresponds to call type CFU, announcement code ANNCODE(2) corresponds to call type CFB, announcement code ANNCODE(3) corresponds to call type CFRNI, etc.

The HLR Database

FIG. 2 shows database HLR 130, in accordance with an embodiment that includes sub-databases or files 210, 220, and 230.

Database 210 includes the subscribed phone numbers and their corresponding classes of service (COS). A phone number thus has the call types defined in its corresponding class of service. In the example of FIG. 2, phone numbers from lines 411–420, 421–430, and 431–440 are associated with COS(1), COS(2), and COS(3), and are thus associated with the call types in COS(1), COS(2), and COS(3), respectively.

Database 220 defines the features for each class of service, which may include one or a combination of call types. A call type may be in one or a plurality of class of service. For example, in FIG. 2, class of service COS(1) includes call type CFU; class of service COS(2) includes call types CFU, CFNRI; and class of service COS(3) includes CFNA, SCA, etc. In an embodiment, a class of service also specifies a digit pattern, which allows further refine the applicability of the announcement by using a pattern of the digit string, such as playing a specific announcement if the area code is 402 and/or the next three digits of the subscribed number is 384, etc.

Database 230 specifies the default class of services to be used in case the subscribers in database 210 are not associated with a class of service. The default class of service in the example of FIG. 2 is CFU.

The data stored in each database in FIG. 2 is in accordance with an embodiment, but the invention is not limited to such arrangements. Various other arrangements are within the scope of embodiments of the invention. For example, the default class of service may be stored in either database 210 or 220; a portion or all data in database 220 and/or 230 maybe stored in database 210; HLR 130 includes all data in one file without having sub-databases or files 210, 220, 230, etc.

Illustrative Method for Making an Announcement in a Telephone Connection

Figure 3:
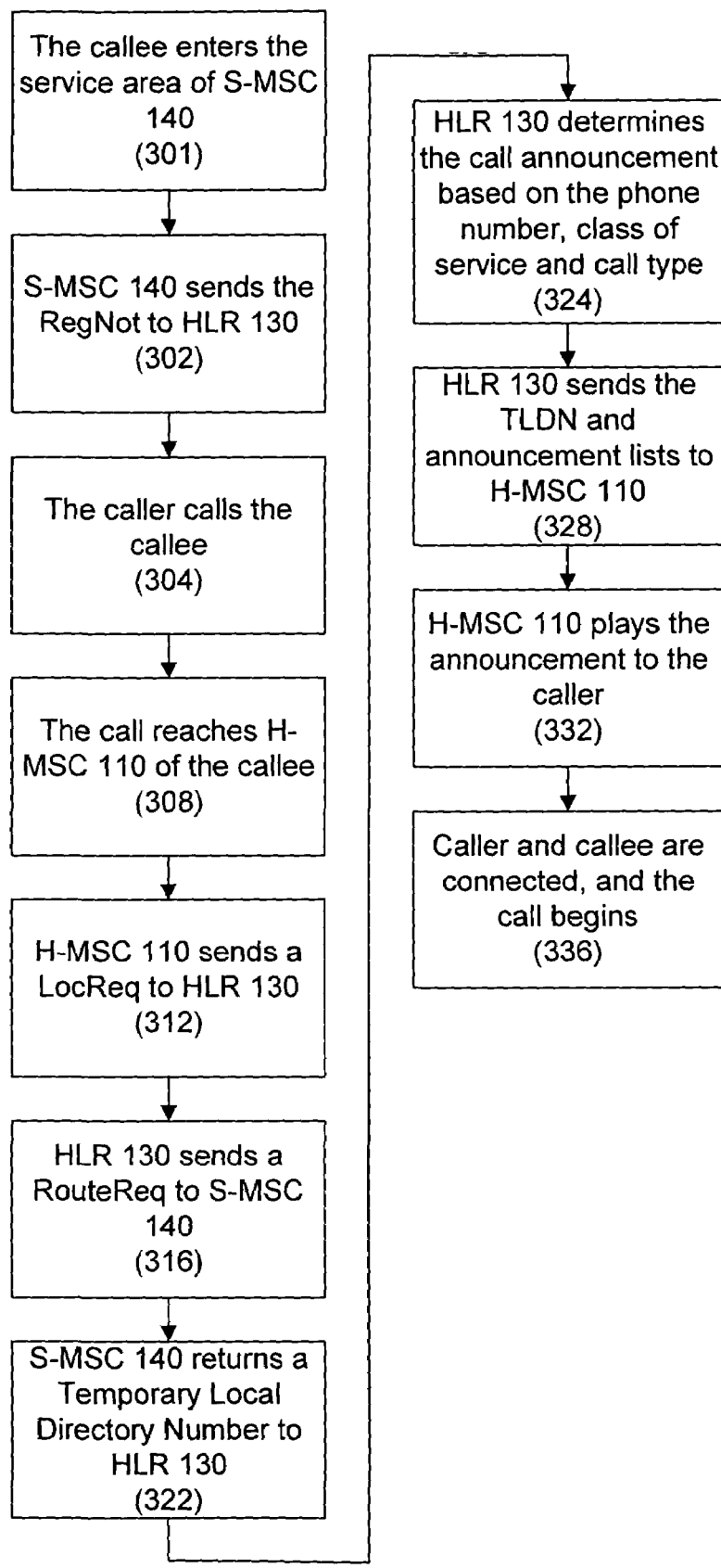
FIG. 3 shows a flowchart illustrating how an announcement is made, in accordance with an embodiment.

FIG. 3 shows a flowchart illustrating how an announcement is made, in accordance with an embodiment. For illustration purposes, a first person (the caller) uses a phone to call a second person (the callee) who has a phone number as a subscriber in HLR 130. Further, the callee and thus his phone have traveled outside of the phone's H-MSC 110.

In step 301, the callee and thus the wireless phone subscriber enter the service area of S-MSC 140.

In step 302, S-MSC 140, having located the called subscriber, sends the Registration Notification Invoke RegNot to HLR 130.

In step 304, the caller calls the callee.

In step 308, the call reaches H-MSC 110 of the callee.

In step 312, H-MSC 110 sends a LocReq to HLR 130.

In step 316, HLR 130 sends a RouteReq to the S-MSC 140.

In step 322, S-MSC 140 returns a Temporary Local Directory Number (TLDN), which will be used by H-MSC 110 to route the call to S-MSC 140 in step 336.

In step 324, HLR 130, based on the subscriber phone number, determines the class of service of the subscriber that includes the call types and based on which HLR 130 determines the appropriate announcement.

In step 328, HLR 130 sends a response to the LocReq of H-MSC 110. HLR 130 also includes the TLDN and the announcement list parameter containing the announcement(s).

In step 332, H-MSC 110 plays the announcement to the caller.

In step 336, the caller and the callee are connected, and the call begins.

Embodiments of the invention are advantageous over other approaches because a class of service may be associated with a plurality of subscribers, which reduces the burden of data entry for operators and the risk for entering erroneous data. For example, in one approach, if there are 2 million subscribers, then there are 2 million entries for call types each corresponding to a subscriber. However, using techniques of the invention, and, for illustration purposes, if a class of service is associated with 2000 subscribers, then there are only 1000 (2,000,000/2,000) entries of class of services.

In the foregoing specification, the invention has been described with reference to specific embodiments. However, it will be evident that various modifications and changes may be made without departing from the broader spirit and scope of the invention. Accordingly, the specification and drawings are to be regarded as illustrative rather than as restrictive.

What is claimed is:

1. A method for making announcements in telephone communications, comprising the steps of:
   providing a plurality of classes of services;
   associating a class of service with one or a plurality of telephone numbers;
   defining the class of service to include one or a plurality of call types;
   corresponding a call type to an announcement; and
   when a telephone number is engaged in a telephone connection,
      identifying the class of service associated with the telephone number;
      identifying the call type associated with the telephone connection and the class of service; and
      based on the identified call type and identified class of service, making an announcement.

2. The method of claim 1 further comprising the step of using a default class of service for a telephone number that has not been associated with a class of service.

3. The method of claim 1 wherein the class of service that includes one or a plurality of call types includes a digit pattern and making the announcement is further based on this digit pattern.

4. A database for use in telephone communications, comprising:
   a plurality of telephone numbers each corresponding to a class of service;
   definitions of classes of services; wherein
      each class of service includes one or a plurality of call types; and
      upon a telephone connection of a telephone number, an announcement is made based on a call type and a class of service associated with the telephone number.

5. The database of claim 4 further comprising a default class of service for use in case the telephone number has not been associated with a class of service.

6. The database of claim 4 wherein a class of service of the classes of service further includes a digit pattern and the announcement is made further based on this digit pattern.

7. The database of claim 4 wherein the plurality of telephone numbers are stored in a first file and the definitions of the classes of services are stored in a second file.

* * * * *